Sept. 22, 1959     L. R. BLAKE     2,905,089
DYNAMO-ELECTRIC MACHINES
Filed Oct. 15, 1957     2 Sheets-Sheet 1
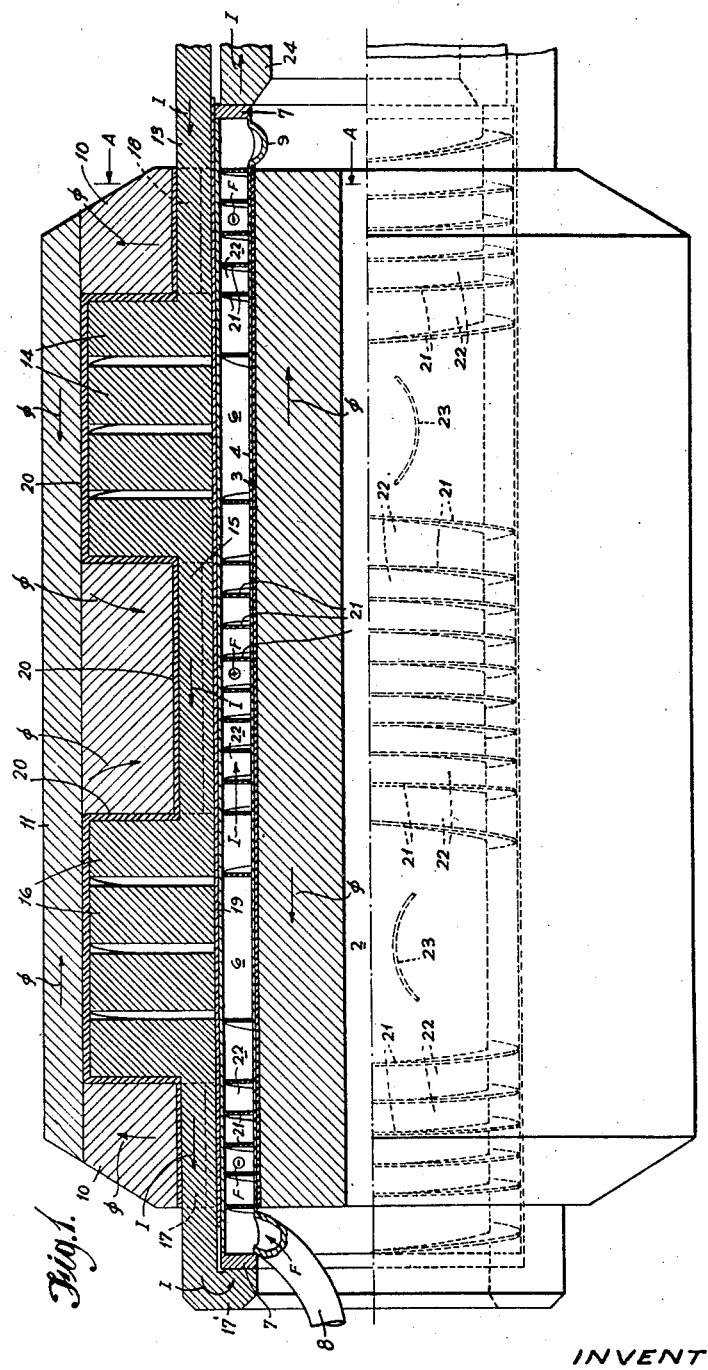
INVENTOR
LESLIE REGINALD BLAKE
ATTORNEY Sept. 22, 1959     L. R. BLAKE     2,905,089
DYNAMO-ELECTRIC MACHINES Filed Oct. 15, 1957     2 Sheets-Sheet 2

INVENTOR
LESLIE REGINALD BLAKE
ATTORNEY

United States Patent Office 2,905,089
Patented Sept. 22, 1959

2,905,089

DYNAMO-ELECTRIC MACHINES

Leslie Reginald Blake, Rugby, England, assignor to The British Thomson-Houston Company Limited, a British company, London, England Application October 15, 1957, Serial No. 690,284

7 Claims. (Cl. 103—1)

This invention relates to dynamo-electric machines as represented by so-called electromagnetic pumps in which an electrically conductive liquid, such for example as liquid metal, is propelled along a duct by reaction between a transverse magnetic field and an electric current passed through the liquid transversely both of the duct and of said field, the action being somewhat analogous to that of a conventional electric motor.

Known forms of direct current electromagnetic pump are generally suitable for use where the ratio of the rate of liquid flow to the outlet pressure of the pump is relatively high, for instance where the flow is twenty gallons per minute and the outlet pressure fifty to eighty pounds per square inch. For smaller ratios of flow to pressure the velocity of the pumped liquid and/or the cross-sectional area of the duct must be reduced. With reduction of velocity, however, the known forms of pump tend to become inefficient and unduly large, while reduction in duct size tends to give rise to difficulties in reducing losses which result from the conductivity of the normally metallic duct walls. Moreover for these smaller ratios the current required remains high and the driving voltage low, both of which features are undesirable. Yet again, in a self-excited pump, namely in which the current passed through the liquid being pumped also traverses an electromagnetic coil for setting up the magnetic field, even a single-turn coil might tend to set up excessive magnetization and thereby actually worsen the pump performance by diverting much of the current into the duct walls and into the liquid adjacent the ends of the duct.

According to the present invention in an electromagnetic pump suitable for use at relatively low ratios of flow to pressure, the electrically conductive liquid being pumped is constrained to flow along a helical duct and means are provided for passing current transversely through the liquid occupying successive turns of the duct helix in a direction lengthwise of the helix axis, whereby the current will traverse the liquid in the successive turns in series, together with a magnetic field structure for providing a magnetic field directed transversely of both the helix axis and the current flow and linking the turns of the duct helix in such manner as by reaction with the current to urge the liquid in a given direction along the duct.

The employment of a helical duct in this manner enable a duct of relatively small cross-section and substantial length to be accommodated in a compact space. Moreover since the applied current flows in series through the liquid in successive turns of the duct helix, the magnitude of current required for a given order of pressure will be reduced.

For providing a suitable magnetic field the magnetic structure conveniently defines at least two oppositely magnetizable poles facing towards the axis of the duct helix and disposed in flux transferring relationship with a magnetic core round which the duct passes so as to lie between it and one of the poles. With the magnetic structure then magnetized either permanently or, preferably, by means of a suitably disposed and energized magnetizing coil or coils, magnetic flux circulating through the structure and core will, at the pole under which the duct lies, pass between the core and the pole in a direction transverse to the axis of the duct helix and thus transverse both to the duct itself and to the current flow across it, being therefore appropriate to urging the liquid along the duct.

In order to utilize the entire length of each turn of the duct helix in the generation of force for propelling the liquid to be pumped, the poles of the magnetic structure each have a generally annular form surrounding the core with the duct lying between one of them and the core. Flux linking the duct in the required manner will then pass (radially) between this latter pole and the core round the entire core periphery.

Furthermore, instead of utilizing the flux at only one pole, a further helical duct, arranged in series with the first in respect of liquid flow therethrough and being oppositely-handed, surrounds the core between it and the other pole with the applied current arranged to pass transversely through the liquid occupying successive turns of this second helix in the same direction as for the first helix; the field at this latter pole, having the opposite polarity to that at the first, will thereby react with the applied current to urge the liquid in the same direction along the duct. If the two helices had the same hand, the same action could be obtained by arranging that the current passing transversely through the liquid in successive turns did so in opposite directions for the two helices.

The helical duct (or ducts) may be defined, within an annular channel surround and insulated from the magnetic core, by means of a metallic partition extending across the channel and helically around and along it, adjacent turns of the duct helix thereby sharing a common metallic wall between them. Annular terminal members concentric with the channel may then be provided at its opposite ends for contacting conductive liquid therein and thereby permitting current to be passed along the channel to traverse in series, as required, the liquid occupying successive turns of the helical duct(s).

For magnetizing the field structure, a helical conductor surrounding the core outwardly of the duct(s) may be arranged axially between and co-axially with the poles with its hand appropriately chosen for setting up the required field directions at the poles. In order to compensate for "armature reaction" effects (analogous to armature reaction in conventional direct current motors) conductors providing connection to the opposite ends of the coil defined by the helical conductor, which connecting conductors may be integral extensions of the helical conductor, may each comprise a number of parallel-connected portions extending through effective axial slots distributed round the inner periphery of the pole adjacent the appertaining end of the coil. One end of the coil may be connected through these conductor portions with a terminal for the application of the current through the liquid in the helical ducts, resulting in the pump being self-excited.

In order that the invention may be more fully understood a particular embodiment of an electromagnetic, liquid metal pump in accordance therewith will now be described with reference to the accompanying drawing in which:

Fig. 1 shows the pump partly in axial section and

Figure 1A:
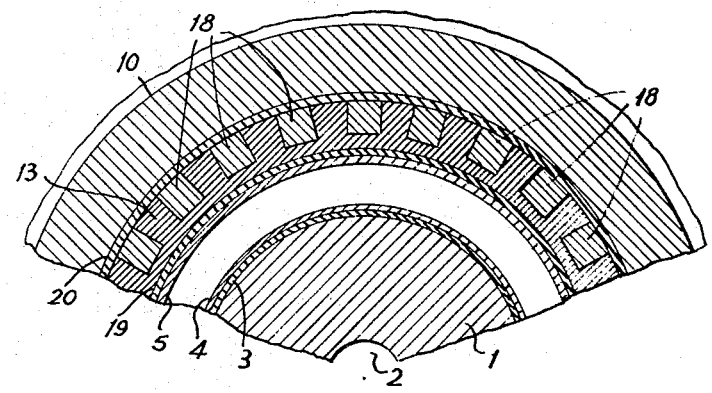
Fig. 1A is a fragmentary section on the line A—A in Fig. 1.

Referring to the drawing the pump has a core 1 of high permeability magnetic material such as that known by the name "Permendur." The core 1, which has been shown as formed with a through bore 2 of small diameter in relation to the remaining wall thickness of the core, is of generally cylindrical shape and has its outer surface separated by an insulating sleeve 3 from the inner of two radially-spaced coaxial tubes 4 and 5 of suitable metal together constituting a structure by which an annular channel 6 is defined between these tubes, and the opposite ends of which are closed by respective metallic rings 7 secured thereto with good electrical contact. These rings 7 act as terminals for the passage of electric current axially along the channel 6 as will be described later. The two tubes 4 and 5 and the channel 6 defined thereby project somewhat beyond the ends of the core, enabling an inlet pipe 8 and an outlet pipe 9 to lead into and from the channel 6 through the projecting end portions of the inner tube 4 as shown.

Also surrounding the core 1, at axially spaced positions respectively adjacent its opposite ends and its center, a magnetic structure including three annular pole pieces 10 is carried by a cylindrical magnetic yoke 11 from which they project inwardly, the inner peripheries of the poles defining cylindrical pole faces which are radially spaced from the outer (5) of the two tubes 4 and 5 defining the channel 6. The yoke 11 and pole pieces 10 thus define in conjunction with the magnetic core 1 two magnetic circuits that respectively extend from the end pole pieces through the core to the intermediate pole piece, which is common to both circuits, and thence back to the end pole pieces by way of the yoke. The yoke and pole pieces may be of low-carbon steel.

An annular current-carrying conductor 13 leads between the outer tube 5 of the channel 6 and the pole piece nearest its outlet end (that is, the right hand pole piece in the drawing) to a magnetizing coil 14 constituted by a helical conductor of, say, four turns which is accommodated co-axially with the bore 1 between the outlet end pole piece and the intermediate one. From this coil 14 an annular conductor 15 leads between the intermediate pole piece and the outer tube 5 of the channel to a second magnetizing coil 16 constituted similarly to the first but oppositely handed and accommodated between the intermediate pole piece and the pole piece adjacent the inlet (left hand) end of the channel 6. This latter coil 16 is connected to the closure ring 7 at the inlet end of the channel by an annular conductor 17 which passes between the inlet end pole piece and the outer channel tube 5 and terminates in an inturned flange portion 17′ by which it is secured in good electrical contact with the end closure ring 7.

The annular conductors 13, 15 and 17, which may be integral with the helical conductors constituting the coils 14 and 16 have their outer surfaces slotted lengthwise of the core to accommodate magnetic inserts 18, as of "Permendur," distributed around the conductor (see Fig. 1A) to constitute effective teeth for the pole pieces 10 and to define between them effective axial pole slots through which the unslotted portions of the conductors extend, it being appreciated that these latter conductor portions are connected electrically in parallel. The conductors and coils are separated by insulation 19 and 20 from the outer tube 5 of the channel 6 on the one hand and from the pole pieces 10 and yoke 11 on the other hand.

Under the three pole pieces 10 vanes 21 of suitable metal form partitions which extend across the annular channel 6 and passing round it in a helical manner to define respective helical ducts 22 along which liquid being pumped is constrained to flow in passing from the inlet towards the outlet end of the channel 6. The helical ducts 22 defined under the end pole pieces 10 have the same hand as each other while the helical duct defined under the intermediate pole piece is oppositely handed, this being necessary, as will appear hereinafter, since the magnetic fields set up between the end pole pieces and the core 1 will be in the opposite sense to that under the intermediate pole piece. The necessary change in direction of the pumped liquid metal in passing from one helical duct to the next is assisted by the provision of director vanes 23 of suitable metal extending across the channel 6 and so shaped as progressively to expand the cross-section of the flow path of the liquid metal and reduce the flow velocity towards zero, thereafter directing the flow into the following, oppositely handed, helical duct. This action can be enhanced, as indicated in the drawing, by extending the helical ducts 22, with progressively increasing cross-sectional area, somewhat beyond the adjacent ends of adjacent pole pieces.

Operation is as follows:

With the annular conductor 13 adjacent the outlet end of the pump connected to, say, the positive terminal of an appropriate direct current supply and the closure ring 7 at the outlet end of the chamber 6 connected to the other supply terminal as through an annular conductor 24 connected to this latter closure ring, the supply terminals not being shown, current I will flow in series through the two magnetizing coils 14 and 16 and then directly along the channel 6, namely lengthwise of its axis, from the inlet end to the outlet end, thereby passing through the liquid metal occupying successive turns of the helical ducts 22 in a direction transverse to its direction of flow F along these ducts.

The energization of the oppositely-handed magnetizing coils 14 and 16 will magnetize in opposite senses the two magnetic circuits defined by the pole pieces 10, yoke 11 and core 1, that is, induced flux will flow round them in opposite directions as indicated by the arrows labelled $\phi$. Consequently, in dependence on the hand of the magnetizing coils, a substantially radial field will be set up between the pole pieces and the core having one sense under the end pole pieces and the opposite sense under the intermediate one.

As the helical ducts 22 defined in the annular channel 6 lie within these fields and the directions of the latter are necessarily transverse to the current flow along the channel 6, the liquid metal in the ducts will be subjected to a force tending to propel it along them. Since, however, the fields under the end pole pieces and that under the intermediate pole piece have opposite senses, this propelling force will act in opposite directions round the core under the end pole pieces and the intermediate pole piece respectively, requiring that the end helical ducts, appropriately handed so that the liquid metal will be propelled along them towards the outlet end of the pump, shall be of opposite hand to the intermediate helical duct as previously described.

The pump illustrated is self-excited by virtue of the magnetizing coils 14 and 16 carrying the same current as traverses the liquid metal being pumped, while armature reaction compensation is provided in an ideal manner by the current-carrying portions of the conductors 13, 15 and 17 passing through the effective slots defined for the pole faces by the inserts 18. With this pump a relatively low ratio of flow to pressure can be obtained (for instance half-a-gallon per minute at sixty pounds per square inch) and the current required can be kept relatively low since it effectively traverses the liquid metal several times, namely in the successive turns of the helical ducts 22. Moreover the arrangement is such that end effects such as have required magnetic field grading in some electromagnetic pumps hitherto, are substantially absent and loss of efficiency due to some of the current which passes through the liquid metal being diverted into regions where the magnetic field is small or negligible (resulting in no useful pressure being developed there) is avoided. A further advantage is that the connections to the direct current supply are made at the same end of the pump.

The metal used for the tubes 4 and 5 defining the annular chamber 6 must be chosen to resist corrosion by the liquid metal to be pumped and for liquid bismuth may be a low chrome-iron alloy. The vanes 21 defining the helical ducts 22 and the director vanes 23 between the ducts must also resist corrosive action of the liquid metal but since the current passing along the annular channel 6 has to pass through these vanes they are also required to have good electrical conductivity and it may therefore be convenient to use some other metal for them. As there should be good electrical contact between the liquid metal and the vanes 21 it may be desirable to add a suitable wetting agent to the liquid metal.

What I claim is:

1. An electromagnetic pump for pumping electrically conductive liquid, comprising in combination, a magnetic structure defining at least two axially spaced cylindrical pole faces, magnetizing means for producing opposite polarities of substantially radial magnetic flux at said two pole faces, helical ducts disposed coaxially within said faces within the influence of the radial magnetic flux thereat, said ducts being of opposite hands with respect to each other and being in communication with each other for flow of said liquid therethrough in series, and terminal means connected to the ducts for permitting an externally produced electric current to be passed axially through the liquid in the ducts in the same axial direction in each, the direction of said current therefore being transverse both to the radial magnetic flux at the pole faces and to the helical direction of liquid flow in the ducts.

2. An electromagnetic pump for pumping electrically conductive liquid, comprising in combination, a cylindrical magnetic core, at least two helical ducts coaxially surrounding said core at axially spaced positions therealong, said two ducts being of opposite hands with respect to each other and being in communication with each other for flow of liquid therethrough in series, a magnetic structure defining at least two cylindrical pole faces respectively surrounding said ducts, magnetizing means for producing opposite polarities of substantially radial magnetic flux between said two pole faces and the core whereby said radial flux cuts said ducts, and terminal means connected to the ducts for permitting an externally produced electric current to be passed axially through the liquid in the ducts in the same axial direction in each, the direction of said current being therefore transverse both to the radial magnetic flux at the pole faces and to the helical direction of liquid flow in the ducts.

3. An electromagnetic pump for pumping electrically conductive liquid, comprising in combination, a cylindrical magnetic core, a magnetic structure including at least two axially spaced annular pole pieces defining respective cylindrical pole faces surrounding and radially spaced from said core, at least two helical ducts surrounding said core between it and the respective pole faces, said two ducts being of opposite hands with respect to each other and being in communication for liquid flow therethrough in series, a magnetizing coil for producing opposite polarities of substantially radial magnetic flux between the respective pole faces and the core, said coil comprising a helical conductor disposed axially between and coaxially with said two pole pieces, and terminal means connected to the ducts for permitting an externally produced electric current to be passed axially through the liquid in the ducts in the same axial direction in each, the direction of said current being therefore transverse both to the radial magnetic flux and to the helical direction of liquid flow in the ducts.

4. An electromagnetic pump according to claim 3 in which one end of said coil is electrically connected to a terminal connected at one end of one of said helical ducts, thereby to permit the electric current passed axially through the liquid in the ducts to be also passed in series through the coil as magnetizing current.

5. An electromagnetic pump for pumping electrically conductive liquid, comprising in combination, a cylindrical magnetic core, structure defining an annular channel surrounding and extending along said core, terminal means at each end of said channel for permitting an externally produced electric current to be passed axially along it, a magnetic structure surrounding said channel and including at least two axially spaced annular pole pieces defining respective cylindrical pole faces facing the channel, a magnetizing coil for producing opposite polarities of substantially radial magnetic flux between said pole faces and the core across the annular channel, said coil comprising a helical conductor disposed axially between said pole pieces and surrounding the annular channel, and metallic partitions extending across and helically around the annular channel and defining, within the portions of the channel between said pole faces and the core, respective helical ducts which are oppositely handed with respect to each other and are in communication through the intervening portion of the annular channel for flow of liquid through said helical ducts in series.

6. An electromagnetic pump for pumping electrically conductive liquid, comprising in combination, a cylindrical magnetic core, a magnetic structure including at least two axially spaced annular pole pieces defining respective cylindrical pole faces surrounding and radially spaced from the core, said pole pieces being effectively slotted with axial slots distributed around said pole face, at least two helical ducts surrounding said core between it and the respective pole faces, said two ducts being of opposite hands with respect to each other and being in communication for liquid flow therethrough in series, a magnetizing coil for producing opposite polarities of substantially radial magnetic flux between the respective pole faces and the core, said coil comprising a helical conductor disposed axially between and coaxially with said two pole pieces, further conductors providing connections to the opposite ends of said coil and each comprising a number of parallel connected portions extending through said slots in the pole piece adjacent the relevant end of the coil, and terminal means connected to the ducts for permitting an externally produced electric current to be passed axially through the liquid in the ducts in the same axial direction in each, the direction of said current being therefore transverse both to the radial magnetic flux and to the helical direction of liquid flow in the ducts.

7. An electromagnetic pump for pumping conductive liquid, comprising in combination, a cylindrical magnetic core, structure defining an annular channel surrounding and extending along said core, terminal means at each end of said channel for permitting an externally produced electric current to be passed axially along it, a magnetic structure surrounding said channel and including three axially spaced annular pole pieces defining respective cylindrical pole faces facing the channel, one of said pole pieces being intermediate the other two, two serially connected, oppositely handed helical conductors surrounding said channel respectively between the intermediate pole piece and the other two pole pieces and constituting magnetizing coils for producing between the pole faces and the core substantially radial magnetic flux of one polarity at the intermediate pole piece and of opposite polarity at each of the other pole pieces, and metallic partitions extending across and helically around the annular channel and defining, within the portions of the channel between said pole faces and the cores, respective helical ducts of which that at the intermediate pole face is oppositely handed with respect to those at the other two pole faces, said ducts being in communication through the intervening portions of the annular channel for flow of liquid through the ducts in series.

References Cited in the file of this patent

UNITED STATES PATENTS

| 1,298,664 | Chubb | Apr. 1, 1919 |
| 2,663,809 | Winslow | Dec. 22, 1953 |
| 2,686,474 | Pulley | Aug. 17, 1954 |
| 2,716,943 | Vandenberg | Sept. 6, 1955 |

FOREIGN PATENTS

| 528,091 | Great Britain | Jan. 26, 1940 |